United States Patent [19]
Boes et al.

[11] Patent Number: 6,099,749
[45] Date of Patent: Aug. 8, 2000

[54] METHOD OF COMPACTING A FUMED METAL OXIDE-CONTAINING COMPOSITION

[75] Inventors: R. Ulrich Boes, Neu Isenburg, Germany; Leroy Ortiz, Albuquerque, N. Mex.; Kevin Roderick, Albuquerque, N. Mex.; Douglas M. Smith, Albuquerque, N. Mex.

[73] Assignee: Cabot Corporation, Boston, Mass.

[21] Appl. No.: 09/161,060

[22] Filed: Sep. 25, 1998

[51] Int. Cl.⁷ .................................................... E04B 1/74
[52] U.S. Cl. .............................. 252/62; 501/133; 264/319
[58] Field of Search ........................ 501/133; 264/319; 252/62

[56] References Cited

U.S. PATENT DOCUMENTS

| | | |
|---|---|---|
| 3,869,334 | 3/1975 | Hughes et al. . |
| 4,332,852 | 6/1982 | Korklan et al. . |
| 4,529,532 | 7/1985 | Gliem et al. . |
| 4,636,416 | 1/1987 | Kratel et al. . |
| 4,726,870 | 2/1988 | McWilliams et al. . |
| 5,211,785 | 5/1993 | Hughes . |

Primary Examiner—Karl Group

[57] ABSTRACT

A method of compacting a fumed metal oxide-containing composition is disclosed. In the method of the present invention, the fumed metal oxide-containing composition is treated with vapor comprising water such that the vapor is adsorbed into the fumed metal oxide so as to produce a vapor-treated fumed metal oxide-containing composition. Pressure is applied to the vapor-treated fumed metal oxide-containing composition to reduce the volume of the metal oxide-containing composition so as to produce a compacted metal oxide-containing composition, which is characterized by a volume springback that is less than the volume springback of the same compacted metal oxide-containing composition prepared in the absence of said vapor treatment.

31 Claims, 6 Drawing Sheets

METHOD OF COMPACTING A FUMED METAL OXIDE-CONTAINING COMPOSITION

TECHNICAL FIELD OF THE INVENTION

The present invention pertains generally to a method of compacting a fumed metal oxide-containing composition, as might be particularly useful in providing thermal insulation.

BACKGROUND OF THE INVENTION

Silica, found in ordinary sand, is an abundant inorganic material having silicon dioxide ($SiO_2$) as a basic structural unit. One type of silica particles is termed pyrogenic, or "fumed silica." Fumed silica typically has a particle size from about 2–20 $\mu$m, and is most commonly prepared from a vapor phase. For example, silica can be vaporized at about 2000° C. in the presence of a reducing agent (e.g., coke) to form SiO, which can be oxidized to form particulate silica. Other methods of producing fumed silica include, for example, oxidation of silicon tetrachloride ($SiCl_4$) at high temperatures or burning $SiCl_4$ in the presence of methane or hydrogen.

One growing commercial application for fumed silica is as the major component in porous (e.g., usually having pores in the 1–1000 nm range) thermal insulation. For example, fumed silica is used in many applications in which high-temperature thermal insulation is required, such as electric stove tops, steam pipes, industrial ovens and furnaces, and elevator fire protection systems. In these and other thermal insulation applications, the fumed silica is typically blended with infrared opacifiers, such as, for example, $TiO_2$ (i.e., titania), carbon black, or zirconium silicate. In addition, the fumed silica is often also blended with fibers (usually in the form of glass, plastic, and/or ceramic) in order to enhance the toughness of the insulation that is ultimately formed. The blend of fumed silica, infrared opacifiers, and, possibly, fibers, is compacted to a target density by applying pressure, usually uniaxially. This increase in density is sought in order to improve the mechanical strength of the insulation.

A significant drawback with known methods of producing fumed silica-based thermal insulation is that, after the pressure for compacting the material is released, the materials suffer from "volume springback" (i.e., they expand in the direction from which the pressure was applied). Not only does this result in a lower actual density, as compared with the target density to which the material was compacted, but it also causes a concomitant decrease in mechanical strength, as well as dimensional uncertainty, delamination, and cracking in the compact.

Another drawback with known methods of producing fumed silica-based thermal insulation relates to mechanical strength. Because many thermal insulation applications have specific mechanical strength requirements that must be met, known methods of producing fumed silica-based thermal insulation require adjusting the density until the desired mechanical strength is exhibited by the insulation. In this regard, although thermal performance is fairly independent of density, the mechanical strength of the insulation is dependent primarily on density in known methods of producing fumed silica-based thermal insulation. Since the fumed silica is the most significant raw material expense in this type of insulation, merely increasing the density to achieve a desired mechanical strength is undesirable because of the high costs associated therewith.

From the foregoing, it will be appreciated that there is a need for an improved method of compacting a fumed metal oxide-containing composition in which the amount of volume springback exhibited by the compact is reduced. It will also be appreciated that there is a need for an improved method of compacting a fumed metal oxide-containing composition in which the mechanical strength of the resulting compact is enhanced at a given density. It is an object of the present invention to provide such a method.

BRIEF SUMMARY OF THE INVENTION

The present invention provides a method of compacting a fumed metal oxide-containing composition, in which, prior to compaction, the fumed metal oxide-containing composition is treated with vapor comprising water such that the vapor is adsorbed into the fumed metal oxide so as to produce a vapor-treated fumed metal oxide-containing composition. Pressure is applied to the vapor-treated fumed metal oxide-containing composition to reduce the volume of the metal oxide-containing composition so as to produce a compacted metal oxide-containing composition. Advantageously, the compacted metal oxide-containing composition is characterized by a volume springback which is less than the volume springback of the same compacted metal oxide-containing composition prepared in the absence of the vapor treatment. Other advantages of the present invention, as well as additional inventive features, will be apparent from the description of the invention provided herein in conjunction with the accompanying drawings.

DESCRIPTION OF THE PREFERRED EMBODIMENTS

Figure 1:
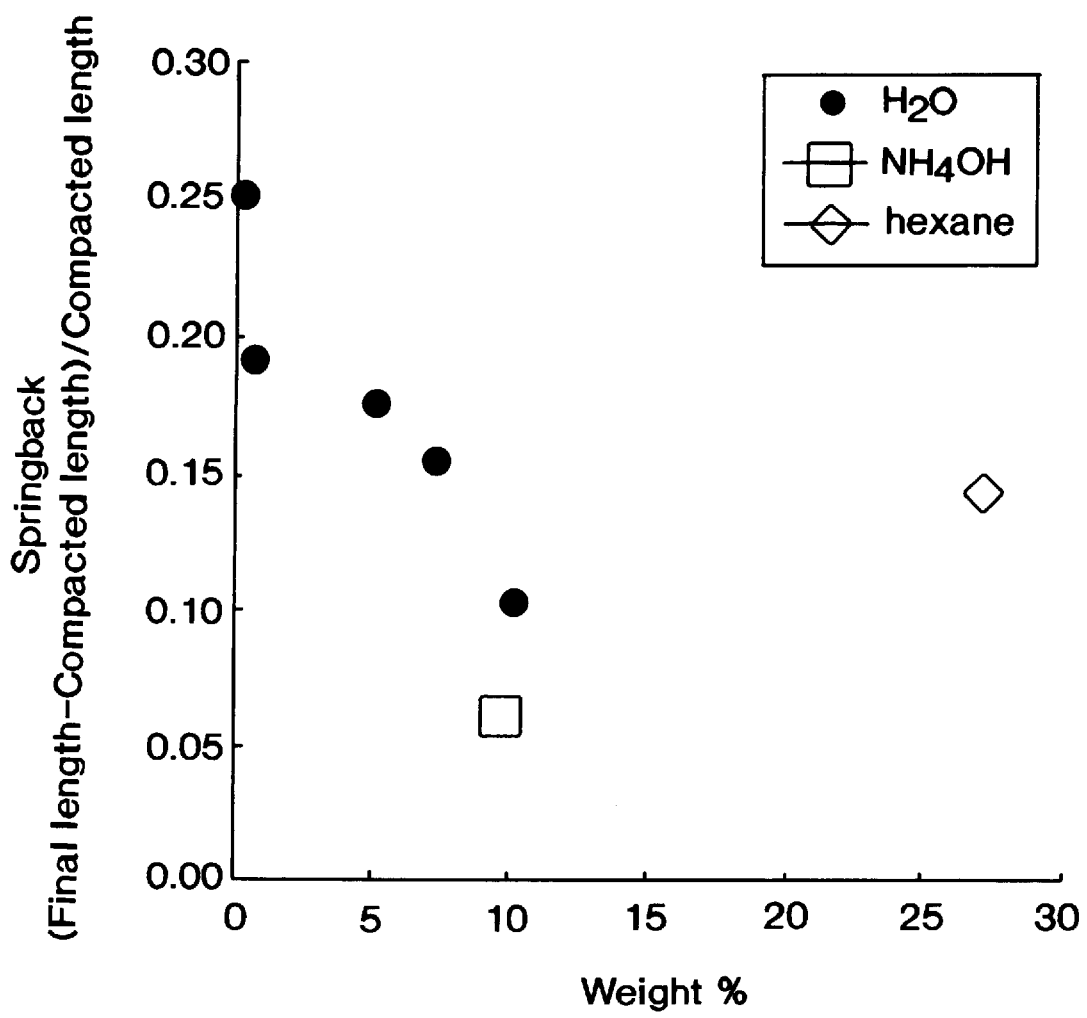
FIG. 1 is a graph illustrating the springback ($\Delta L/L$) of treated and untreated fumed silica-based compacts versus the weight percentage of water, ammonium hydroxide ($NH_4OH$), or hexane in the fumed silica-based compacts.

The present invention is predicated, at least in part, on the discovery that treating a fumed metal oxide-containing composition with vapor comprising water is advantageous in compacting the composition. By way of example, the vapor-treated fumed metal oxide-containing composition exhibits reduced volume springback after pressure is released as compared with metal oxide-containing compositions prepared in the absence of the vapor treatment. In this regard, the pressure is applied to the metal oxide-containing composition in order to produce a metal oxide-containing composition that is compacted to a target density and volume. By reducing the amount of volume springback after compaction, the incorporation of vapor in the inventive method permits the production of a product (for example, thermal insulation), which possesses an actual density after pressure is released that more closely approximates the target density reached under pressure, unlike metal oxide-containing compositions that are not treated with vapor where the difference between the target density and the actual density can be much more dramatic. In addition, treating the fumed metal oxide-containing composition with vapor, in accordance with the present invention, results in a compacted metal oxide-containing composition that exhibits enhanced mechanical strength at a given density. Furthermore, the present invention allows for manufacture times to be reduced advantageously. In particular, the amount of time required for compacting the metal oxide-containing composition, i.e., the amount of time the fumed metal oxide-containing composition is maintained under the applied pressure (usually from about 30 seconds to about 2 minutes), in order to produce a compacted metal oxide-containing composition characterized by any predetermined volume springback is reduced pursuant to the present inventive method as compared to the time under pressure required to prepare compacted metal oxide-containing compositions characterized by the same volume springback in the absence of the vapor.

In particular, the present invention provides a method of compacting a fumed metal oxide-containing composition. The metal oxide preferably is silica, although other metal oxides, such as, for example, titania, alumina, and the like, as well as combinations of metal oxides, are encompassed within the scope of the present invention. The metal oxide typically is in the form of particles which can have any suitable physical characteristics, such as primary particle size (e.g., 5–50 nm diameter), aggregate particle size, and surface area (e.g., 50–500 m$^2$/g). The fumed metal oxide-containing composition is treated with vapor comprising water such that the vapor is adsorbed into the fumed metal oxide-composition so as to produce a vapor-treated fumed metal oxide-containing composition. Pressure is applied to the vapor-treated fumed metal oxide-containing composition to reduce the volume of the metal oxide-containing composition so as to produce a compacted metal oxide-containing composition, also referred to herein as a "compact."

Significantly, the compacted vapor-treated fumed metal oxide-containing composition is characterized by a volume springback which is less than the volume springback of the same compacted metal-oxide containing composition prepared in the absence of the vapor treatment. As noted above, the pressure is usually applied until a target density or volume is reached. For most applications, the metal oxide-containing composition is poured in powder form into a die and compacted from one end or two opposing ends such that the applied load is only in one direction (i.e., uniaxial compaction). As such, the springback occurs in only one dimension, and, accordingly, linear and volume springback are the same. In some other applications, however, the metal oxide-containing composition is compacted from all dimensions (i.e., isostatic compaction), in which case the springback occurs in all dimensions such that that the linear and volume springback are different.

In accordance with the present invention, upon release of the pressure (whether uniaxially or isostatically applied), the amount of volume springback (i.e., relaxation or expansion in the direction of the applied load) is minimized. Preferably, the amount of volume springback is about 20% or less of the volume of the fumed metal oxide-containing composition while under pressure at the target density. More preferably, the amount of volume springback is about 15% or less of the volume of the fumed metal oxide-containing composition while under pressure at the target density. Even more preferably, the amount of volume springback is about 10% or less of the volume of the fumed metal oxide-containing composition while under pressure at the target density. By way of comparison, the compacted vapor-treated metal oxide-containing compositions prepared pursuant to the inventive method preferably demonstrate a volume springback that is about 75% or less, more preferably 50% or less, and even more preferably 25% or less, of the volume springback of compacted vapor-treated metal oxide-containing compositions prepared in the absence of vapor treatment and otherwise treated under the same conditions (e.g., amount of pressure and time of applied pressure).

The metal oxide can be blended or otherwise combined with one or more other components, depending on the application, to form the metal oxide-containing composition, as desired. For example, one application for which the inventive method has particular utility is in the production of fumed silica-based thermal insulation. In this application, the fumed metal oxide-containing composition desirably includes at least one opacifier (e.g., infrared opacifiers), such as, but not limited to, carbon black, titania, and zirconium silicate. The fumed metal oxide-containing composition can also (or alternatively) include fibers, such as, for example, glass, ceramic, and/or plastic fibers. When fibers are present, they preferably comprise 10 wt. % or less of the fumed metal oxide-containing composition. Yet another possibility is that the fumed metal oxide-containing composition can include other types of metal oxides that are non-fumed, such as, for example, precipitated silica, silica gel, and/or silica aerogel. Preferably, the fumed metal oxide component comprises about 40 wt. % or more of the fumed metal oxide-containing composition. In some embodiments, the fumed metal oxide component comprises about 50 wt. % or more, about 75 wt. % or more, or even about 90 wt. % or more of the fumed metal-containing composition. In other embodiments, the fumed metal oxide-containing composition consists essentially of or even consists entirely of the fumed metal oxide.

As noted, the vapor comprises water (i.e., steam). In this respect, the vapor can optionally include other vapor components, or, alternatively, it can consist entirely of water vapor or consist essentially of water vapor. Additional vapor components that can be included in the vapor (if desired) include, but are not limited to, acids (e.g., hydrochloric acid) and bases (e.g., ammonium hydroxide). Of course, the additional vapor components desirably should be innocuous inasmuch as toxic or harmful products desirably should not be produced. Preferably, the vapor treatment results in a weight gain of the fumed metal oxide-containing composition of about 0.5% or more, and more preferably about 5% or more. In some embodiments, the vapor treatment results in a weight gain of the fumed metal oxide-containing composition of about 10% or more, about 15% or more, or even about 20% or more.

Significantly, the inventive method desirably includes the use of vapor, as opposed to liquid. The use of a liquid treatment is less beneficial than a vapor treatment, both in terms of attenuating the extent of volume springback and in imparting enhanced mechanical strength. As such, vapor (as opposed to liquid) is desirably mixed with the fumed metal oxide-containing composition, which is usually in powder form, by any suitable techniques. Preferably, the metal oxide-containing composition is intricately mixed with the vapor to ensure satisfactory contact between the metal oxide-containing composition and the vapor, e.g., by tumbling the metal oxide-containing composition in a vapor steam, such that the vapor is adsorbed on the surface of the metal oxide-containing composition.

The compacts produced in accordance with the present invention can be used for many purposes, such as, for example, insulation, especially thermal insulation. In this respect, the compacts can be used to insulate any suitable surface, such as, but not limited to, storage containers, tanks, piping, stove tops, industrial ovens and furnaces, and fire protection systems. In that respect, the compacts of the present invention typically will be used in conjunction with other larger containers, and the like, as is known in the art.

The following examples further illustrate the present invention but, of course, should not be construed as in any way limiting its scope.

EXAMPLE 1

This example illustrates the reduction in springback associated with treating a fumed metal oxide-containing composition prior to compaction.

Seven mixes of 65 wt. % fumed silica in the form of M5 Cab—O—Sil® (having a primary particle size of about 14 nm and a surface area of about 200 $m^2$/gram), commercially available from Cabot Corporation, 30 wt. % milled rutile (serving as infrared opacifier), and 5 wt. % glass fibers were blended in a high speed blender to achieve adequate dispersion of the resulting blends. One blend was then pressed dry (i.e., it remained untreated). Four blends were treated with water vapor such that each blend contained 0.5%, 5%, 7%, and 10% by weight of water vapor, respectively. Another blend was treated with ammonium hydroxide vapor so that it contained 10% by weight ammonium hydroxide vapor ($NH_4OH$), and yet another blend was treated with hexane vapor so that it contained 27% by weight n-hexane vapor. After pressing each treated or untreated blend (in a die for 60 seconds by way of the same amount of uniaxially delivered pressure) to a target density of 0.25 g/$cm^3$ to form compacts, the actual density and springback were measured for each compact. The springback was established in the form of ΔL/L. In this regard, ΔL signified the difference between the length of the compact under pressure and the final length of the compact after springback. ΔL was then divided by the initial length to which the compact was compacted (prior to the occurrence of springback). The other dimensions of the compact remained the same, and, therefore, the springback in terms of ΔL/L reflect volume springback.

The resulting data was plotted in graph form and appears as FIG. 1. Particularly, the springback (ΔL/L) was plotted versus the weight percentage of the treating component, if any (i.e., no treatment, water, $NH_4OH$, or n-hexane), in the compact. In FIG. 1, the symbol "●" represents the blends treated with water vapor and one blend that was untreated, while the symbol "□" represents the blend treated with $NH_4OH$, and the diamond symbol represents the blend treated with hexane. As is apparent from FIG. 1, significant reductions in springback were observed for the treated blends as compared with the untreated blend. The water vapor treatments proved to be the most desirable. Although the $NH_4OH$ treated blend provided an even lower springback than the water treated blends, the ammonia waste product makes such a treatment less desirable than the water treatment. In addition, the n-hexane treatment was less successful than the water treatment insofar as a higher weight percentage of n-hexane was required to reduce a similar level of springback as compared with water.

EXAMPLE 2

This example illustrates the effects of density and vapor treatment on the strength of metal oxide-containing compacts.

Six different fumed silica based blends were prepared as described in Example 1. One of the blends remained untreated. Three of the blends were treated with water vapor such that each blend contained 0.5%, 4.9%, and 7.1% by weight of water vapor, respectively. A fifth blend was treated with hexane vapor so that it contained 27.0% by weight hexane vapor. The sixth blend was treated with $NH_4OH$ vapor so that it contained 9.7% by weight $NH_4OH$. Each of the blends was uniaxially compacted for 60 seconds under the same amount of pressure into a block of the material at a target density of 0.25% g/$cm^3$. Of course, due to differing springback effects (depending on the presence and amount of vapor treatment) the compacted blocks exhibited actual densities ranging from 0.203 g/$cm^3$ to 0.240 g/$cm^3$.

A motor was utilized to push a cylindrical pin (much smaller than the blocks) at a constant rate into each compacted block. A cell measured the load (per area) that the compacted block samples put back on the pin (i.e., the resistance of the samples to the pin). The strain was also determined by measuring the displacement of the pin into each compacted block sample. The resulting data was plotted in graph form and appears as FIG. 2. In plotting the load (kg/$m^2$) versus the strain ($\mu$m), the resulting stress-strain curves for each of the samples were evaluated. In this respect, the slopes of the stress-strain curves represent the "compressive modulus," which is a measure of the mechanical strength of each of the compacted block samples.

Figure 2:
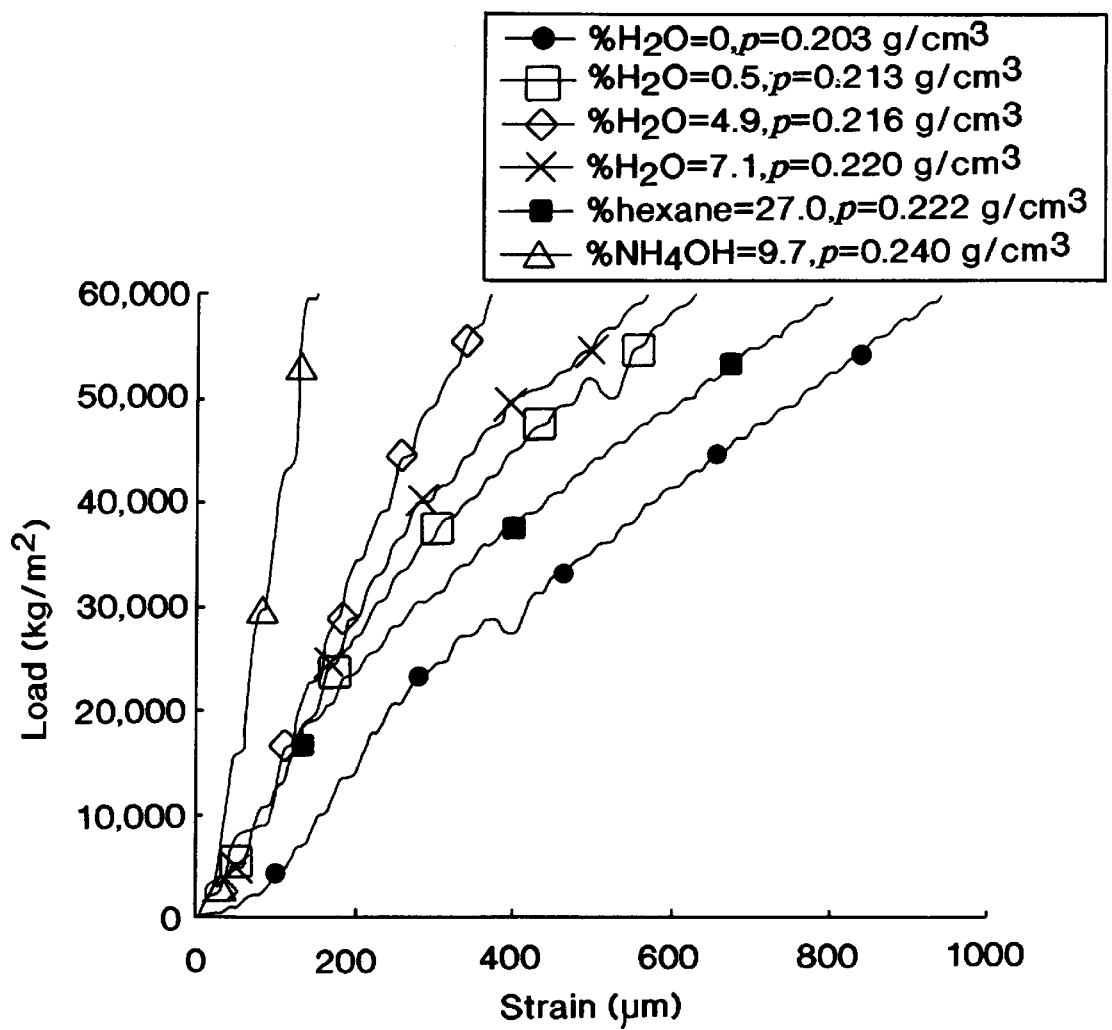
FIG. 2 is a graph illustrating the load ($kg/m^2$) of a fumed silica-based compact that is treated with different quantities of different vapors versus strain ($\mu$m), such that stress-strain curves for the compacts are seen.

In FIG. 2, the symbol "●" represents the untreated sample, which had an actual density (ρ) of 0.203 g/$cm^3$. The symbol "□" represents the sample containing 0.5% by weight water vapor, which had an actual ρ of 0.213 g/$cm^3$. The diamond symbol represents the sample containing 4.9% by weight water vapor, which had an actual ρ of 0.216 g/$cm^3$. The symbol "X" represents the sample containing 7.1% by weight water vapor, which had an actual ρ of 0.220 g/$cm^3$. The symbol "■" represents the sample containing 27.0% by weight hexane vapor, which had an actual ρ of 0.222 g/$cm^3$. The symbol "Δ" represents the sample containing 9.7% by weight $NH_4OH$ vapor, which had an actual ρ of 0.240 g/$cm^3$.

As is apparent from FIG. 2, the untreated sample exhibited the weakest mechanical strength. The sample treated with the hexane vapor displayed the second weakest strength, even though a higher content (27 wt. %) of the hexane vapor was incorporated into the sample as compared with the other treated samples. Within experimental error, the strength of the sample increased as the water vapor content increased. In fact, the samples treated with water vapor provided the best combination of strength and safety. In this respect, even though the sample treated with $NH_4OH$ demonstrated the highest strength, the ammonia released in the course of the process made such a treatment somewhat less desirable than treatment with water vapor. FIG. 2 also shows vast differences in strain even though the densities of the respective samples did not vary nearly as much, thereby indicating the importance of the vapor treatment in enhancing strength. Although increased density alone may promote strength, the use of the vapor treatment enhanced the strength of the resulting compacts even more.

Figure 3:
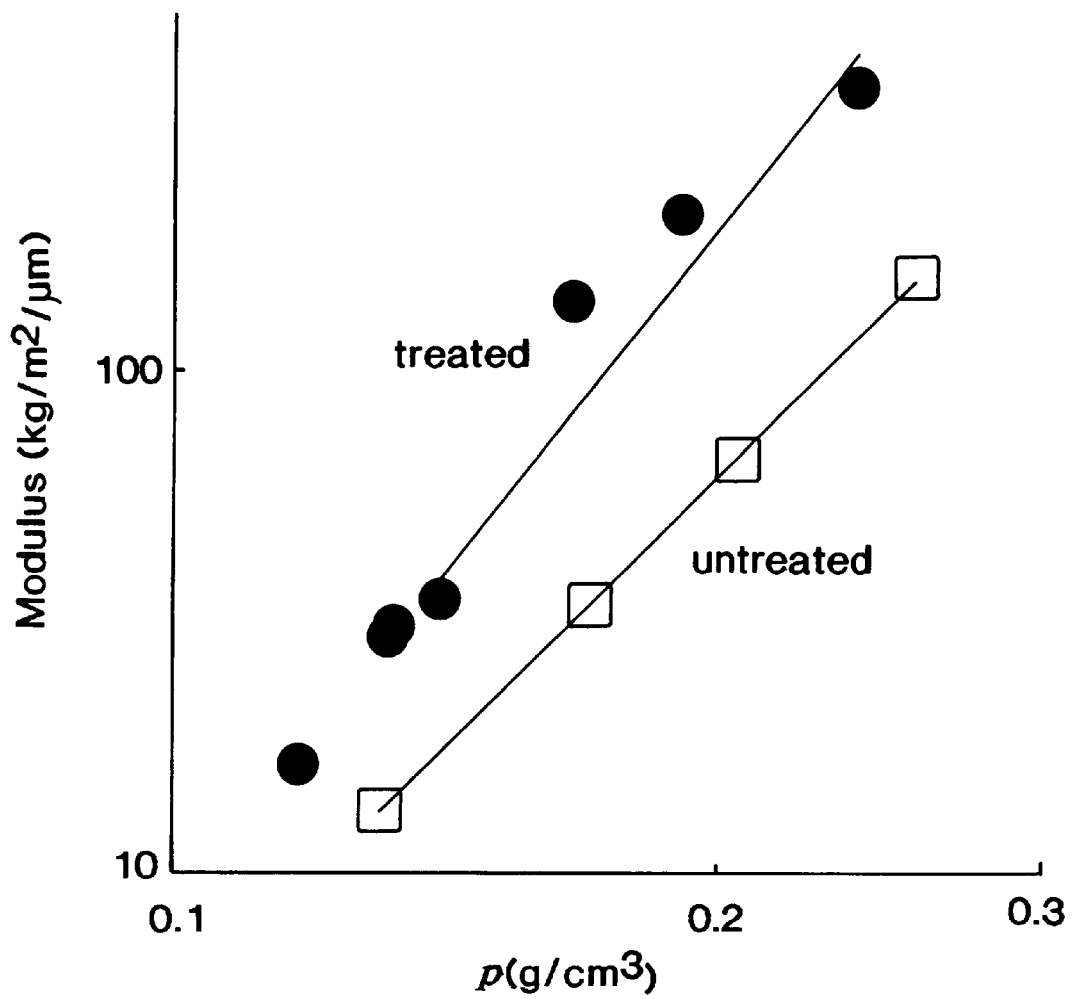
FIG. 3 is a graph (in log-log scale) illustrating the modulus ($kg/m^2/\mu m$), calculated as the slopes of stress-strain curves, versus density ($g/cm^3$) for untreated and treated fumed silica-based compacts of the same type.

The fact that the vapor treatment enhances the strength of the compacts (and that the increase in strength is not due only to the increased density) is seen further in FIG. 3. In particular, the modulus (kg/cm$^2$/μm) was plotted versus the actual density (i.e., after springback) in log-log scale for treated and untreated fumed silica-based compacts. In FIG. 3, the symbol "●" represents samples treated with NH$_4$OH so that they contained 9.7% by weight NH$_4$OH, and the symbol "□" represents the untreated samples. As is apparent from FIG. 3, at the same density, the treated samples have a higher modulus as compared with the untreated samples. In addition, the slopes of the treated and untreated fumed silica compact samples were slightly different, with the treated samples reflecting a slightly greater slope. While not intending to be bound to any particular theory, it is believed that the greater slope of the treated samples indicates that the increase in the modulus is due in part to some mechanism(s) dependent on particle-to-particle contacts, which increase as density increases.

Accordingly, this example demonstrates that samples treated with vapor exhibit much stronger mechanical strength than untreated samples (e.g., 2–3 times stronger) at a given density.

EXAMPLE 3

This example demonstrates that the strength of fumed metal oxide-containing compacts of the present invention is maintained, and generally slightly increases, upon exposure to elevated temperatures. This strength maintenance at high temperatures is important because many applications for fumed metal oxide-containing compacts relate to high temperature insulation.

Eight different fumed silica based blends were prepared as described in Example 1. All of the blends were uniaxially compacted under the same amount of pressure for 60 seconds. Two of the compacts, one having an actual density of 0.203 g/cm$^3$ and the other having an actual density of 0.254 g/cm$^3$ (the latter being the only sample of the eight to have been pressed to a target density other than 0.25 g/cm$^3$, namely, 0.3 g/cm$^3$), remained dry and were not treated with vapor of any kind. Four of the compacts were treated with water vapor such that the water vapor comprised 0.5%, 4.9%, 7.1%, and 10% by weight of the compact samples, respectively. The seventh sample was treated with hexane vapor such that the sample contained 27% by weight hexane, and the eighth sample was treated with NH$_4$OH vapor such that the sample contained 9.7% by weight NH$_4$OH vapor. In order to assess whether the strength increases associated with vapor treatment (as observed, for example, in Example 2) remained after use at elevated temperatures, the samples were calcined in air for one hour at temperatures of up to 600° C.

Figure 4:
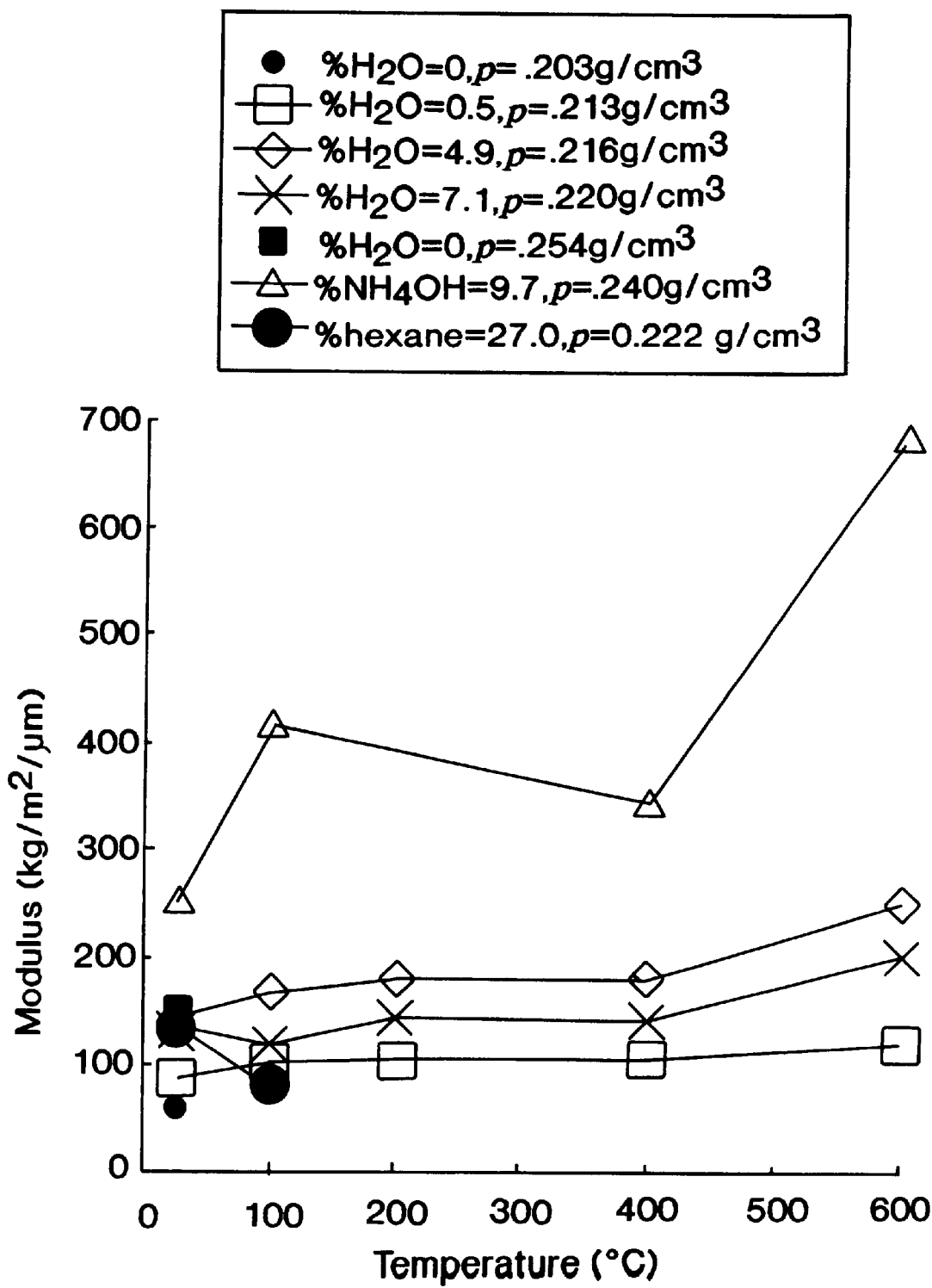
FIG. 4 is a graph illustrating the modulus ($kg/m^2/\mu m$) versus post-treatment temperature for untreated and treated fumed silica-based compacts of the same type.

The resulting data is plotted in FIG. 4. Specifically, the modulus (kg/m$^2$/μm) was plotted as a function of the heat treatment, i.e., temperature (° C.). In FIG. 4, the symbol "●" represents the untreated sample, which had an actual ρ of 0.203 g/cm$^3$. The symbol "□" represents the sample containing 0.5 wt. % water vapor, which had an actual ρ of 0.213 g/cm$^3$. The diamond represents the sample containing 4.9 wt. % water vapor, which had an actual ρ of 0.216 g/cm$^3$. The symbol "X" represents the sample containing 7.1 wt. % water vapor, which had an actual ρ of 0.220 g/cm$^3$. The symbol "■" represents the untreated sample having a density of 0.254 g/cm$^3$. The symbol "Δ" represents the sample containing 9.7 wt. % NH$_4$OH, which had an actual ρ of 0.240 g/cm$^3$. The symbol "●" represents the sample containing 27 wt. % hexane, which had an actual ρ of 0.222 g/cm$^3$. As is apparent from FIG. 4, with the exception of the hexane vapor-treated sample, the samples retained their moduli associated with the vapor treatment. Notably, the samples exhibited strength increases at 600° C. While not wishing to be bound by any particular theory, it is believed that this increase in strength is due to thermally-activated surface silanol condensation that produces siloxane bonds between neighboring silica particles.

As noted above, one of the untreated compact samples had the highest density of all of the compact samples (i.e., 0.254 g/cm$^3$). As seen in FIG. 4, even though this untreated sample had the highest density, the treated samples of lower density nevertheless generally demonstrated greater strength.

Accordingly, this example demonstrates that the enhanced strength of the compacts obtained by way of the present inventive vapor treatment is retained upon exposure to high temperatures.

EXAMPLE 4

This example illustrates the effects of using a lower density fumed silica, as well as the use of a different opacifier, and the use of varying fiber contents, on the strength of the sample.

Figure 5:
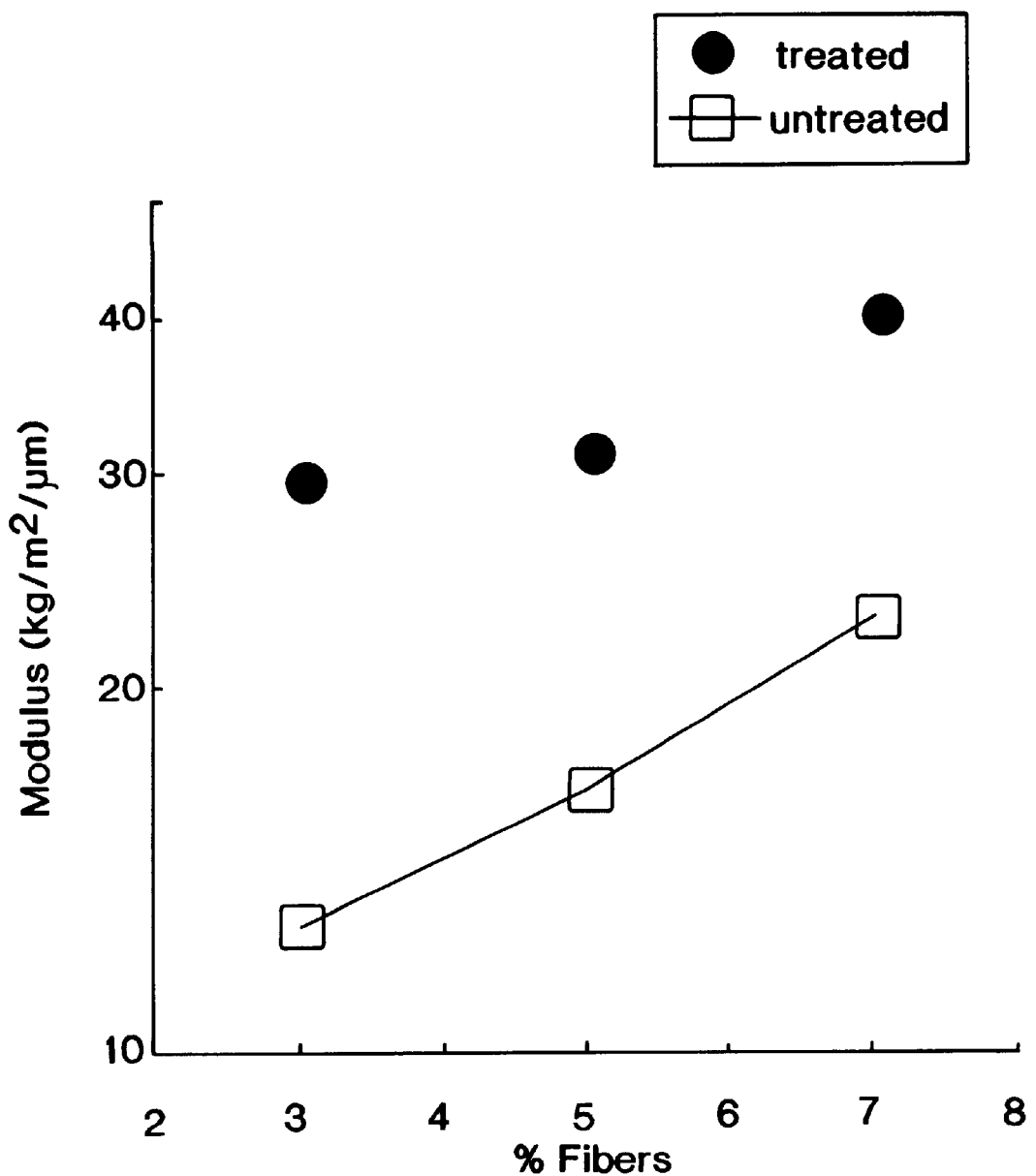
FIG. 5 is a graph illustrating the modulus ($kg/m^2/\mu m$) versus the percentage of glass fibers included in untreated and treated fumed silica-based compacts of the same type.

Fumed silica-based blends were prepared with 83%, 85%, or 87% by weight EH5 Cab-O-Sil® fumed silica (having a primary particle size of about 7 nm and a surface area of about 380 m$^2$/g), 10% by weight R300R carbon black (commercially available from Cabot Corporation) infrared opacifier, and 3%, 5%, and 7% by weight glass fibers. Each of the samples was compacted under the same amount of uniaxially applied pressure for 60 seconds. The modulus (kg/m$^2$/micron) of each of the samples was plotted versus the weight percentage of the fibers in each of the samples, with the results shown in FIG. 5. Inasmuch as the target density was somewhat lower (i.e., 0.15 g/cm$^3$) than the target density of the fumed silica-based samples in Examples 1–3, the modulus values were comparatively somewhat lower. Some of the compact samples were untreated while others were treated with NH$_4$OH vapor so that they contained 9.7% by weight NH$_4$OH. In FIG. 5, the symbol "●" represents the treated samples, while the symbol "□" represents the untreated samples. As is apparent from FIG. 5, the treated samples exhibit higher modulus values than the untreated samples.

Figure 6:
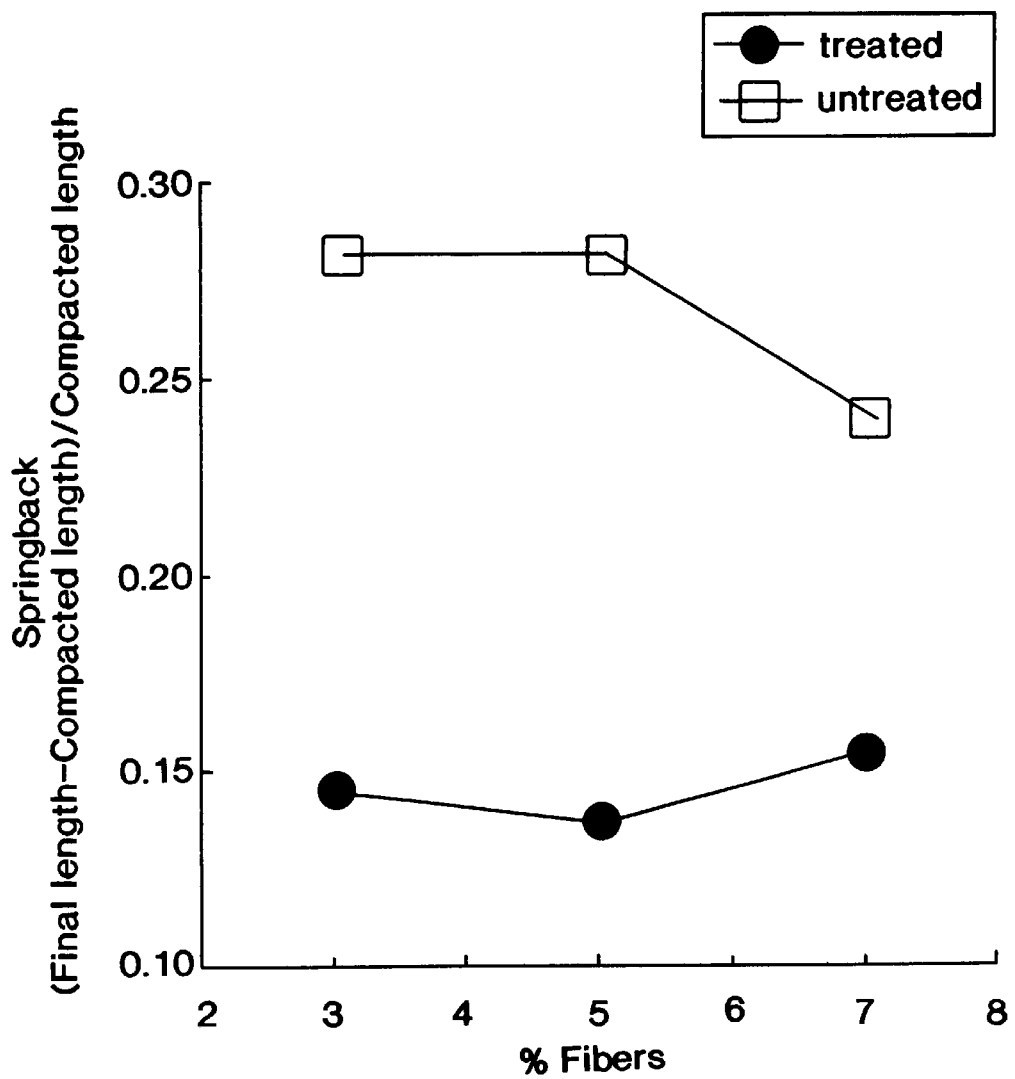
FIG. 6 is a graph illustrating springback ($\Delta L/L$) versus the percentage of glass fibers include in untreated and treated fumed silica-based compacts of the same type.

In addition, the springback of the samples (as described in Example 1) was evaluated as a function of the weight percentage of glass fibers included therein. The resulting data is plotted in FIG. 6. Again, in FIG. 6, the symbol "●" represents samples treated with NH$_4$OH so that they contained 9.7% by weight NH$_4$OH, and the symbol "□" represents the untreated samples. As shown in FIG. 6, the springback was significantly reduced for the vapor-treated samples as compared to the untreated samples. Accordingly, this example demonstrates that the vapor treatment enhances the mechanical strength of different fumed silicas and also demonstrates that the mechanical strength can be enhanced even more by increasing the fiber content of the fumed metal oxide compacts.

EXAMPLE 5

This example compares untreated compacts with compacts that have been treated with liquid water, as well as with compacts that have been treated with water vapor. Particularly, the samples were compared in terms of the amount of springback exhibited by the samples after being pressed to a target density.

Five samples of fumed silica-based blends were made by blending 67 wt. % M5 Cab-O-Sil® fumed silica, 30 wt. % rutile (infrared opacifier) and 3 wt. % glass fibers. The samples were evaluated in a manner similar to that set forth in Example 1. In particular, the samples were compacted under the same amount of uniaxially applied pressure for 60 seconds to a target density of 0.25 g/cm$^3$. The resulting data is set forth in Table I.

TABLE I

| Treatment | Density (g/cm$^3$) | Springback (ΔL/L) | % Springback After Treatment (as compared to untreated sample) |
| --- | --- | --- | --- |
| Untreated fumed silica blend | 0.203 | 0.188 | — |
| Fumed silica blend + 5 wt. % liquid water | 0.206 | 0.176 | 93.6% |
| Fumed silica blend + 10 wt. % liquid water | 0.208 | 0.168 | 89.4% |
| Fumed silica blend + 15 wt. % liquid water | 0.214 | 0.144 | 76.5% |
| Fumed silica blend + 10 wt. % water vapor | 0.221 | 0.116 | 61.7% |

As is apparent from the data set forth in Table I, the sample treated with water vapor exhibited the lowest springback. While not intending to be bound by any particular theory, it is believed that treatments with liquid water are less desirable than treatments with water vapor, because the liquid can cause local densification in the sample in the form of aggregated regions of high density. Not only is the inhibition of springback less effective when using a liquid as opposed to vapor, but also the thermal performance and mechanical strength can be compromised as well.

Accordingly, this example demonstrates that treating fumed metal oxide-containing samples with vapor is more desirable than treating fumed metal oxide-containing blends with liquid. In this regard, after compacting the fumed metal oxide-containing samples, the samples treated with vapor exhibited less springback than the samples treated with liquid or the samples that were not treated.

While this invention has been described with an emphasis upon preferred embodiments, it will be obvious to those of ordinary skill in the art that the variations of the preferred embodiments may be practiced otherwise than specifically described herein. Accordingly, this invention includes all modifications encompassed within the spirit and scope of the invention as defined by the following claims.

What is claimed is:

1. A method of compacting a fumed metal oxide-containing composition comprising (a) providing a fumed metal oxide-containing composition, (b) treating said fumed metal oxide-containing composition, in the absence of liquid, with vapor comprising water such that said vapor is adsorbed into said fumed metal oxide so as to produce a vapor-treated fumed metal oxide-containing composition, wherein the vapor treatment results in a weight gain of the fumed metal oxide-containing composition of about 0.5% or more, and (c) applying pressure to said vapor-treated fumed metal oxide-containing composition to reduce the volume of said metal oxide-containing composition so as to produce a compacted metal oxide-containing composition.

2. The method of claim 1, wherein said metal oxide is selected from the group consisting of silica, titania, alumina, and combinations thereof.

3. The method of claim 2, wherein said metal oxide is silica.

4. The method of claimed 1, wherein said vapor consists essentially of water.

5. The method of claim 4, wherein said vapor consists of water.

6. The method of claim 1, wherein said vapor further comprises an acid.

7. The method of claim 6, wherein said acid is hydrochloric acid.

8. The method of claim 1, wherein said vapor further comprises a base.

9. The method of claim 8, wherein said base is ammonium hydroxide.

10. The method of claim 1, wherein said compacted fumed metal oxide-containing composition has a volume springback that is about 20% or less of the volume of the fumed metal oxide-containing composition while under pressure.

11. The method of claim 10, wherein said volume springback of said compacted fumed metal oxide-containing composition is about 15% or less of the volume of the fumed metal oxide-containing composition while under pressure.

12. The method of claim 11 wherein said volume springback of said compacted fumed metal oxide-containing composition is about 10% or less of the volume of the fumed metal oxide-containing composition while under pressure.

13. The method of claim 1, wherein said volume springback of said compacted fumed metal oxide-containing composition is about 75% or less of said volume springback of the same compacted metal oxide-containing composition prepared in the absence of said vapor treatment and otherwise treated under the same conditions.

14. The method of claim 13, wherein said volume springback of said compacted fumed metal oxide-containing composition is about 50% or less of said volume springback of the same compacted metal oxide-containing composition prepared in the absence of said vapor treatment and otherwise treated under the same conditions.

15. The method of claim 1, wherein said fumed metal oxide-containing composition is tumbled while being treated with said vapor in step (b).

16. The method of claim 1, wherein said vapor treatment results in a weight gain of the fumed metal oxide-containing composition of about 5% or more.

17. The method of claim 16, wherein said vapor treatment results in a weight gain of the fumed metal oxide-containing composition of about 10% or more.

18. The method of claim 17, wherein said vapor treatment results in a weight gain of the fumed metal oxide-containing composition of about 15% or more.

19. The method of claim 18, wherein said vapor treatment results in a weight gain of the fumed metal oxide-containing composition of about 20% or more.

20. The method of claim 1, wherein said fumed metal oxide-containing composition comprises a fumed metal oxide component and one or more other components.

21. The method of claim 20, wherein said fumed metal oxide component comprises about 40 wt. % or more of said fumed metal oxide-containing composition.

22. The method of claim 21, wherein said fumed metal oxide component comprises about 50 wt. % or more of said fumed metal oxide-containing composition.

23. The method of claim 22, wherein said fumed metal oxide component comprises about 75 wt. % or more of said fumed metal oxide-containing composition.

24. The method of claim 23, wherein said fumed metal oxide component comprises about 90 wt. % or more of said fumed metal oxide-containing composition.

25. The method of claim 20, wherein said one or more other components comprise fibers.

26. The method of claim 25, wherein said fibers comprise 10 wt. % or less of said fumed metal oxide-containing composition.

27. The method of claim 20, wherein said one or more other components comprise opacifiers.

28. The method of claim 20, wherein said one or more other components comprise precipitated silica, silica gel, and/or silica aerogel.

29. The method of claim 1, wherein said fumed metal oxide-containing composition consists essentially of said fumed metal oxide.

30. The method of claim 29, wherein said fumed metal oxide-containing composition consists of said fumed metal oxide.

31. The method of claim 1, wherein said method further comprises insulating a surface with said compacted famed metal oxide-containing composition.

* * * * *